(12) United States Patent
Kunkel

(10) Patent No.: US 11,395,033 B2
(45) Date of Patent: Jul. 19, 2022

(54) VIDEO CONTENT CONTROLLER AND ASSOCIATED METHOD

(71) Applicant: DOLBY LABORATORIES LICENSING CORPORATION, San Francisco, CA (US)

(72) Inventor: Timo Kunkel, Kensington, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 0 days.

(21) Appl. No.: 17/134,949

(22) Filed: Dec. 28, 2020

(65) Prior Publication Data

US 2021/0120306 A1 Apr. 22, 2021

Related U.S. Application Data

(63) Continuation of application No. 16/008,701, filed on Jun. 14, 2018, now Pat. No. 10,904,607.

(Continued)

(51) Int. Cl.
*G06F 3/048* (2013.01)
*H04N 21/431* (2011.01)
*H04N 21/6587* (2011.01)
*G06F 3/16* (2006.01)
*H04N 13/366* (2018.01)

(Continued)

(52) U.S. Cl.
CPC .......... *H04N 21/4316* (2013.01); *G06F 3/16* (2013.01); *H04N 13/366* (2018.05); *H04N 21/4728* (2013.01); *H04N 21/47217* (2013.01);

*H04N 21/6587* (2013.01); *G06F 3/165* (2013.01); *H04N 13/344* (2018.05)

(58) Field of Classification Search
None
See application file for complete search history.

(56) References Cited

U.S. PATENT DOCUMENTS 7,222,300 B2 5/2007 Toyama
7,383,508 B2 6/2008 Toyama
(Continued)

OTHER PUBLICATIONS

Joshi, N. et al "Cliplets: Juxtaposing Still and Dynamic Imagery",UIST'12—Proceedings of the 25th Annual ACM Symposium on User Interface Software and Technology, Oct. 7-10, 2012, p. 251-260.

(Continued)

*Primary Examiner* — Claudia Dragoescu

(57) ABSTRACT

A video content controller includes a memory and a microprocessor. The memory is configured to store non-transitory computer-readable instructions and video data representing a temporally-varying scene having a plurality of scene-regions. The microprocessor adapted to execute the instructions to (i) receive a current stream-segment of a video stream corresponding to a first scene-region of the plurality of scene-regions during a current playback-time interval, (ii) download, to a memory, a first video segment of a tagged scene-region within the first scene-region, (iii) receive a first display-region signal indicating at least one of a selection and a feature of the first scene-region, (iv) combine the current stream-segment and the first video segment as a video signal, and (vi) transmit, in response to the first display-region signal, the video signal to a display device.

20 Claims, 4 Drawing Sheets

Related U.S. Application Data

(60) Provisional application No. 62/530,749, filed on Jul. 10, 2017.

(51) Int. Cl.
*H04N 21/472* (2011.01)
*H04N 21/4728* (2011.01)
*H04N 13/344* (2018.01)

(56) References Cited

U.S. PATENT DOCUMENTS

| | | | |
|---|---|---|---|
| 8,396,127 B1 | 3/2013 | Bultje | |
| 8,406,608 B2 | 3/2013 | Dubin | |
| 8,872,850 B2 | 10/2014 | Joshi | |
| 8,942,542 B1 | 1/2015 | Sherrets | |
| 8,957,915 B1 | 2/2015 | Chalasani | |
| 9,082,198 B2 | 7/2015 | Mashiah | |
| 9,201,974 B2 | 12/2015 | Arrasvuori | |
| 9,292,956 B2 | 3/2016 | Hoppe | |
| 9,330,718 B2 | 5/2016 | Middleton | |
| 9,373,187 B2 | 6/2016 | Ugur | |
| 2008/0234844 A1 | 9/2008 | Boustead | |
| 2008/0271082 A1* | 10/2008 | Carter | H04N 21/4858 725/51 |
| 2013/0229581 A1 | 9/2013 | Joshi | |
| 2014/0292769 A1 | 10/2014 | S V | |
| 2014/0298006 A1* | 10/2014 | Shaik | H04N 21/6181 713/153 |
| 2014/0359157 A1* | 12/2014 | Bichot | H04N 21/8547 709/231 |
| 2015/0077421 A1 | 3/2015 | Lehtiniemi | |
| 2015/0121445 A1* | 4/2015 | Jung | H04N 21/4347 725/116 |
| 2016/0381398 A1* | 12/2016 | Saxena | H04N 21/816 348/39 |
| 2018/0310010 A1* | 10/2018 | Hourunranta | H04N 19/597 |
| 2019/0098348 A1* | 3/2019 | Gruneberg | H04N 21/4347 |

OTHER PUBLICATIONS

Tompkin, J. et al "Towards Moment Imagery: Automatic Cinemagraphs"., Visual Media Production (CVMP), 2011 Conference for, London, 2011, pp. 87-93.

* cited by examiner

VIDEO CONTENT CONTROLLER AND ASSOCIATED METHOD

CROSS-REFERENCE TO RELATED APPLICATIONS

This application is a continuation of U.S. patent application Ser. No. 16/008,701, filed on Jun. 14, 2018, which claims priority to U.S. Provisional Patent Application No. 62/530,749, filed on Jul. 10, 2017 and entitled "Video Content Controller and Associated Method," the contents of which is hereby incorporated by reference in its entirety.

FIELD OF THE INVENTION

Embodiments of the present invention relate to systems and methods for generating a video signal in response to an input signal generated by a viewer of the displayed video.

BACKGROUND

Video displays, e.g., head-mounted displays, are capable of displaying part or all scene-regions of a panoramic scene. A viewer of the video display may determine which scene-region of the panoramic scene is in the viewer's field of view by generating an input signal received by a video content controller communicatively coupled to the video display. For efficient use of bandwidth between the video content controller and the video display, some conventional video content controllers stream high-resolution video to scene-regions within a viewer's field of view, while also streaming lower-resolution video to regions outside of viewer's field of view.

SUMMARY

In one embodiment, a method for generating a video signal representing a temporally-varying scene having a plurality of scene-regions is disclosed. The method includes steps of: receiving a current stream-segment, downloading, receiving a display-region signal, combining, and transmitting. The step of receiving is one of receiving a current stream-segment of a video stream corresponding to a first scene-region of the plurality of scene-regions during a current playback-time interval. The step of downloading is one of downloading, to a memory, a first video segment of a tagged scene-region within the first scene-region. In the step of receiving the first display-region signal, the signal indicates at least one of a selection and a feature of the first scene-region. The step of combining is one of combining the current stream-segment and the first video segment as the video signal. The step of transmitting is one of transmitting, in response to the first display-region signal, the video signal to a display device.

In another embodiment, a video content controller is disclosed, which includes a memory and a microprocessor. The memory is configured to store non-transitory computer-readable instructions and video data representing a temporally-varying scene having a plurality of scene-regions. The microprocessor adapted to execute the instructions to (i) receive a current stream-segment of a video stream corresponding to a first scene-region of the plurality of scene-regions during a current playback-time interval, (ii) download, to a memory, a first video segment of a tagged scene-region within the first scene-region, (iii) receive a first display-region signal indicating at least one of a selection and a feature of the first scene-region, (iv) combine the current stream-segment and the first video segment as a video signal, and (vi) transmit, in response to the first display-region signal, the video signal to a display device.

DETAILED DESCRIPTION OF THE EMBODIMENTS

Figure 1:
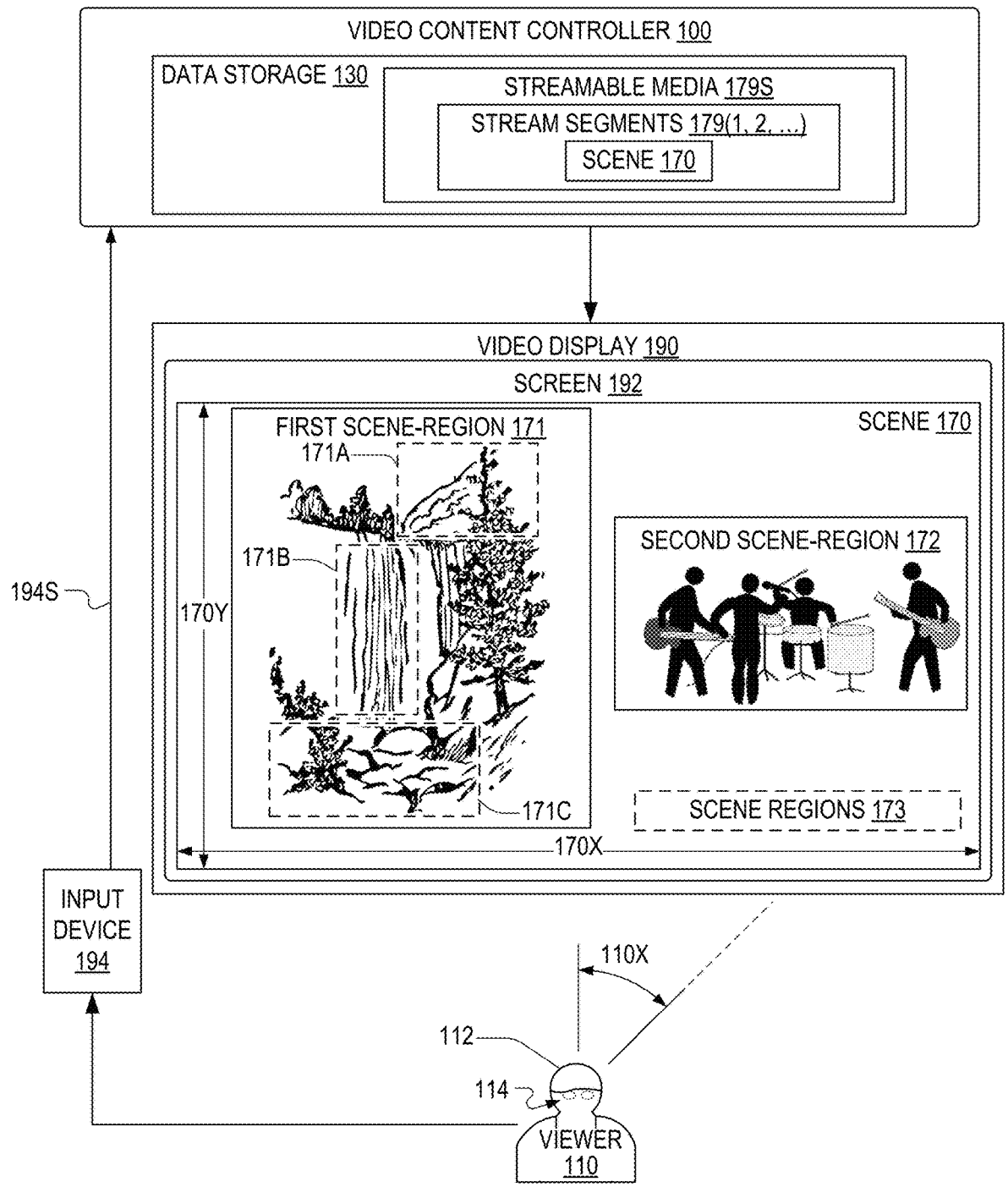
FIG. 1 is a schematic diagram of a video content controller communicatively coupled to a video display and an input device, in an embodiment.

FIG. 1 is a schematic diagram of a video content controller 100 communicatively coupled to a video display 190 and an input device 194. Video content controller 100 includes a data storage 130 that stores streamable media 179S. Streamable media 179S includes a plurality of stream segments 179 representing temporal segments of a scene 170. Video display 190 displays scene 170 on a screen 192 thereof. In an exemplary use scenario, a viewer 110 views screen 192 and uses input device 194 to control, via video content controller 100, how video display 190 displays streamable media 179S.

Video content controller 100 may serve as an interface between different types of video displays 190 and input devices 194. Video display 190 may be a reference monitor, computer monitor or display, a television set, a head-mounted display, a virtual retinal display, or the like. Input device 194 may be a keyboard, a pointing device, a head-mounted display, an eye tracker, or the like. In a first example use scenario, video display 190 is a reference monitor or a computer monitor, and input device 194 is a pointing device. In a second example use scenario, video display 190 is a head-mounted display, and input device 194 is either an eye tracker or a head tracker of the head-mounted display.

In embodiments, scene 170 has a horizontal angle of view 170X and a vertical angle of view 170Y. Scene 170 may also, e.g., be a panoramic scene, in which angles of view 170X and 170Y are 360° and 180°, respectively. Angles of view 170X and 170Y may equal any other pair of angles without departing from the scope hereof. Angles of view 170X and 170Y may refer to the angle of view of video content potentially available to viewer 110 by moving a horizontal field of view (FOV) 110X. The angular extent of FOV 110X is in a plane parallel to a plane of horizontal angle of view 170X. Horizontal FOV 110X is an example of a viewport.

Scene 170 includes a first scene-region 171 and a second scene-region 172, which are both spatial regions of scene 170. Second scene-region 172 may be video footage of a band performing on stage at an outdoor venue. First scene-region 171 is, for example, an outdoor scene of an off-stage portion that is part of the venue or located adjacent thereto. First scene-region 171 includes subregions 171A, 171B, and 171C that, for example, include a mountain, a waterfall, and rocks, respectively. Hereinafter, for sake of clarity, subregions 171A, 171B, and 171C are also referred to as mountain region 171A, waterfall region 171B, and rock region 171C. Scene 170 may include additional scene-regions 173.

The foregoing description is of video content controller 100 in response to input device signals 194S corresponding to changes of horizontal FOV 110X. It should be appreciated that the same description applies equally to input device signals 194S corresponding to changes of a vertical field of view. In a use scenario of video content controller 100, viewer 110 has horizontal FOV 110X. Viewer 110 also has a vertical screen field-of-view in a plane parallel to a plane of horizontal angle of view 170Y. Input device 194 sends a display-region signal 194S that indicates which parts of scene 170 are in FOV 110X.

As illustrated in FIG. 1, viewer 110 has a head 112 and eyes 114, such that viewer 110 is oriented with respect to screen 192 such that FOV 110X includes second scene-region 172, but not first scene-region 171. Depending on the nature of input device 194, viewer 110 may use input device 194 to send signal 194S indicating that viewer FOV 110X is to include at least part of scene-region 171.

In a first example, video display 190 is a computer monitor, and input device 194 is a pointing device such a mouse, trackball, or a touchpad. Input device may also be integrated into video display 190, e.g., as hardware that enables video display 190 to be a touch-screen. In this first example, viewer 110 uses input device 194 to indicate first scene-region 171, for example, by moving a pointer on screen 192 to first scene-region 171. When video display 190 is a touch screen, viewer 110 may touch a region of screen 192 that is displaying first scene-region 171.

In a second example and a third example, video display 190 is part of a head-mounted display, angle of view 170X equals 360°, and the vertical field of view of 180°. In the second example, input device 194 is a head tracker of the head-mounted display, and viewer 110 must rotate head 112 for input device 194 to send signal 194S indicating that viewer FOV 110X includes first scene-region 171. In the third example, input device 194 is an eye tracker, e.g., of video display 190, and movement of eyes 114 may result in input device 194 sending signal 194S indicating that FOV 110X includes first scene-region 171.

For efficient use of bandwidth between a video controller and a display, some conventional video content controllers stream high-resolution video to scene-regions within viewer FOV 110X while also streaming lower-resolution video to regions outside of viewer FOV 110X. However, when a conventional video content controller receives signal 194S indicating that a new scene-region, such as first scene-region 171, has entered FOV 110X, viewer 110 sees a low-resolution rendering of first scene-region 171 during the time required for a conventional video controller to send a high-resolution video of first scene-region 171 to video display 190. Embodiments disclosed herein eliminate display of low-resolution video in viewer FOV 110X.

Figure 2:
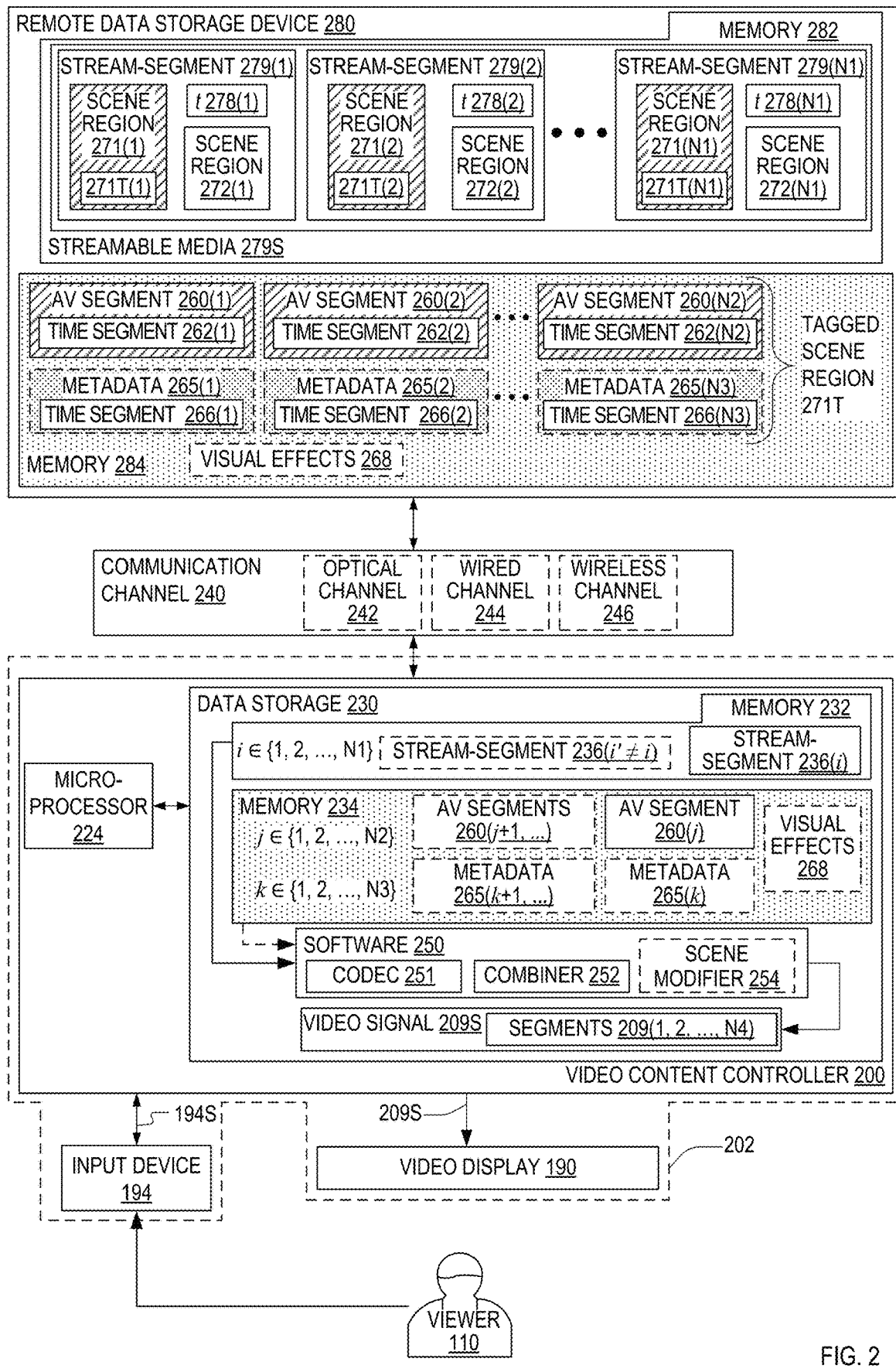
FIG. 2 is a block diagram of an embodiment of the video content controller of FIG. 1 in an example use scenario.

FIG. 2 is a block diagram of a video content controller 200 in an example use scenario. In this scenario, video content controller 200 is communicatively connected to a remote data storage device 280 via a communication channel 240. Video content controller 200 is also communicatively connected to video display 190 and input device 194. One or both video display 190 and input device 194 may be part of video content controller 200. For example, video content controller 200 and video display 190 may be in a common housing 202 and be mounted on a common printed circuit board. Video content controller 200 includes both video display 190 and input device 194 when, for example, video display 190 is a head-mounted display and input device 194 is a head tracker or an eye tracker.

Communication channel 240 may include at least one of an optical channel 242, a wired channel 244, and a wireless channel 246. Remote data storage device 280 includes a memory 282 and a memory 284, and may be a server, a server cluster, a workstation, a personal computer, or a combination thereof.

Video content controller 200 is an example of video content controller 100. Video content controller 200 includes a microprocessor 224 and a data storage 230. Microprocessor 224 may be a graphics processing unit.

Data storage 230 includes memory 232 and memory 234. Each of memory 232, 234, 282, and 284 may be transitory and/or non-transitory and may include one or both of volatile memory (e.g., SRAM, DRAM, or any combination thereof) and nonvolatile memory (e.g., FLASH, ROM, magnetic media, optical media, or any combination thereof). Memory 232 may be or include a data buffer (such as a framebuffer), e.g., for facilitating streaming of streamable media 279S. Data storage 230 may include at least one of the following, for example in one or both of memory 232 and memory 234: (a) non-volatile buffer, (b) a volatile buffer for on-demand rendering tasks (e.g., spatial and color transforms), and (c) a framebuffer, where a final combined viewport (e.g., as part of video signal 209S) may be stored before being transferred to video display 190.

Memory 232 and 234 may be distinct pieces of hardware or be respective partitions of a common memory device. Similarly, memory 282 and 284 may be distinct pieces of hardware or be respective partitions of a common memory device. Part or all of memory 232 and 234 may be integrated into microprocessor 224.

Remote data storage device 280 stores video data associated with a temporally-varying scene to be displayed by video display 190. Memory 282 stores streamable media 279S, which includes a plurality of stream-segments 279($i$). Each stream-segment 279($i$) represents streamable media 279S at a respective time interval 278($i$), where i∈ {1, 2, . . . , N1} and N1 is a positive integer. Streamable media 279S is an example of streamable media 179S.

Each stream-segment 279($i$) may be digital video content encoded per a video coding format. Candidate video coding formats include, and are not limited to, MPEG-2, MPEG-4, H.264, AVC, HEVC, and others known the current or future state of the art. Each of time interval 278($i$) may correspond to a respective one of a plurality of different timecodes or to a respective one of a plurality of different timecode ranges. Each of the plurality of timecode ranges may be temporally non-overlapping. Each of the plurality of timecodes are SMPTE time codes, for example.

Each of stream-segment 279($i$) includes a respective scene-region 271($i$) and 272($i$). Scene-regions 171 and 172 of FIG. 1 are examples of scene-regions 271 and 272, respectively. Each scene-region 271($i$) includes therein a respective tagged scene-region 271T(i). When first scene-region 271 is first scene-region 171, each subregion 171A, 171B, and 171C are candidates for tagged scene-region 271T. Part of tagged scene-region 271T may be outside of first scene-region 271. For example, a first part of tagged scene-region 271T may be located in first scene-region 271 and a second part of scene-region 271 may be located in second scene-region 272.

Memory 284 stores at least one AV segment 260($j$) corresponding to respective time segments 262($j$), where j∈{1, . . . , N2} and N2 is a positive integer. Memory 284 may also store metadata 265($k$) corresponding to respective time segments 266(k), where k∈{1, ..., N3} and N3≥1 is a positive integer. AV segments 260(j) and metadata 265(k) may correspond to tagged scene-region 271T. For example, AV segment 260(j) may correspond to a portion of one or more stream-segments 279(i), e.g., temporally consecutive stream-segments 279, corresponding to tagged scene-region 271T(i). Each time segment 262(j) and 266(k) may correspond to one or more time intervals 278, such as consecutive time intervals 278(i) and 278(i+1). Integers N1, N2, and N3 may be equal.

In an example use scenario, scene-regions 271 and 272 correspond to scene-regions 171 and 172 of FIG. 1, and tagged scene-region 271T is waterfall region 171B. In this scenario, AV segment 260(1) is video footage of waterfall region 171B that has a duration z equal to time segment 262(1). Duration T equals ten seconds, for example. AV segment 260(1) may correspond to tagged scene-region 271T of streamable media 279S during a time duration equal to time segment 262(1). Time segment 262(1) may correspond to time interval 278(1). AV segment 260(1) is, for example, equal to an extracted portion of streamable media 279S corresponding to tagged scene-region 271T of stream-segments 279(1) to 279(q), where integer q≤N1. AV segment 260(1) may be equal to a compressed version of the aforementioned extracted portion of streamable media 279S.

Memory 284 may also store one or more additional AV segments 260(2-N2), where N2≥2 is a positive integer. Continuing the example in which AV segment 260(1) is video footage of waterfall region 171B, memory 284 stores AV segment 260(2). AV segment 260(2) is also video footage of waterfall region 171B, during a time segment 262(2) that occurs, in this example, after time segment 262(1). In this example, second scene-region 272 corresponds to scene-region 172 (FIG. 1), which shows a live musical performance. The live musical performance may last several hours that includes a sunset, during which ambient illumination of mountain region 171A, waterfall region 171B, and rock region 171C changes significantly. Hence, AV segment 260(1) may correspond to waterfall region 171B before sunset, while AV segment 260(2) may correspond to tagged scene-region 271T (showing waterfall region 171B) after sunset, such as during civil, nautical, or astronomical twilight. Accordingly, memory 284 may include more than two AV segments 260, such that at least one segment 262 is, or corresponds to, tagged scene-region 271T during daytime, civil twilight, nautical twilight, astronomical twilight, and nighttime.

Any of AV segments 260 may be a single still image. Memory 284 may store such a still image in an image file format used in the art, such as a raster format, a vector format, or combination thereof. Any of AV segments 260 may include a 3D image pair (stereoscopic images), a volumetric image, and a depth map.

Memory 284 may also store metadata 265. For example, each metadata 265(1-N3) is associated with a respective playback time segment 266(1-N3). Each time segment 266 may correspond with a respective time segment 262, e.g., when N2=N3. Metadata may include, but are not limited to, reference display parameters, auxiliary signal parameters and scene attributes such as color space information, color gamut information, luminance, chrominance, color histogram, brightness, contrast, gamma correction, saturation, and local spatial pixel/area context. Metadata 265 is, for example, dynamic metadata, such that metadata 265 changes according to associated time segment 266.

In an example use scenario, scene-regions 271 and 272 correspond to scene-regions 171 and 172 of FIG. 1, respectively, and tagged scene-region 271T is rock region 171C. In this example, N2=1 and N3>1 such that memory 284 stores only one AV segment 260 (segment 262(1)) while storing a plurality of metadata 265(1-N3). Segment 262(1) is a still image, as its contents, rock region 171C (e.g., large rocks), are generally stationary throughout stream-segments 279.

However, in this example the content of rock region 1710 changes according to illumination thereon, e.g., by the sun during daytime, civil twilight, nautical twilight, astronomical twilight, and nighttime. Other causes of such illumination changes may include change of cloud cover (altering the color temperature of the illumination), and change of shadows (e.g., going from direct sun to full cloud cover). Hence metadata 265(1-N3) corresponding to rock region 171C includes, in this example, luminance data of rock region 171C at different times corresponding to stream-segments 279. For example, if streamable media 279S corresponds to a live event having a three-hour duration that spans daytime, sunset, and nighttime, N3 may equal eighteen such that metadata 265(1-N3) includes luminance data for rock region 171C at ten-minute intervals during the three-hour duration of streamable media 279S.

Memory 284 may also store visual effects 268 associated with tagged scene-region 271T. For example, when first scene-region 271 is first scene-region 171 (FIG. 1) tagged scene-region 271T corresponds to subregion 171A, visual effects 268 may include a bird flying through subregion 171A. Visual effects 268 may include variants of the same visual effect. For example, referring to the aforementioned bird, visual effects 268 may include a plurality of unique "bird visual effects", such that implementation of a "bird traversal" effect may include selection one the plurality of unique bird visual effects. Types of visual effects 268 may be a result of a compositing technique known in the art of video production, such as chroma key.

Data storage 230 of video content controller 200 stores software 250. Software 250 includes the following software modules: a codec 251, a combiner 252. Modules of software 250 may also include a scene modifier 254. Codec 251, for example, implements specifications of one or more of the above-mentioned candidate video coding formats associated with stream-segments 279.

Memory 232 of video content controller 200 stores a stream-segment 236(i), where i∈{1, 2, . . . , N1}, as in stream-segments 279. Stream-segment 236(i) may include part or all of stream-segment 279(i), and have at least a fraction of the full resolution of stream-segment 279(i). For example, stream-segment 236(i) includes only a part of stream-segment 279(i) that includes either or both of scene-regions 271(1) and 272(1). Memory 232 may also store at least one additional stream-segment 236(i'), where i'≠i, which corresponds part or all of stream-segment 279(i').

Memory 234 of video content controller 200 stores AV segment 260(j) and may also store subsequent AV segments 260, e.g., at least one of AV segments 260(j+1, j+2, ..., N2). Memory 234 may also store metadata 265 corresponding to subsequent playback times, e.g., at least one of metadata 265(k+1, k+2, ..., N3).

Video content controller outputs a video signal 209S. Video signal 209S is formed of a plurality of temporal segments 209(m), where m∈{1, 2, . . . , N4}, where N4 is a positive integer. Integer N4 may equal integer N1 associated with streamable media 279S.

Figure 3:
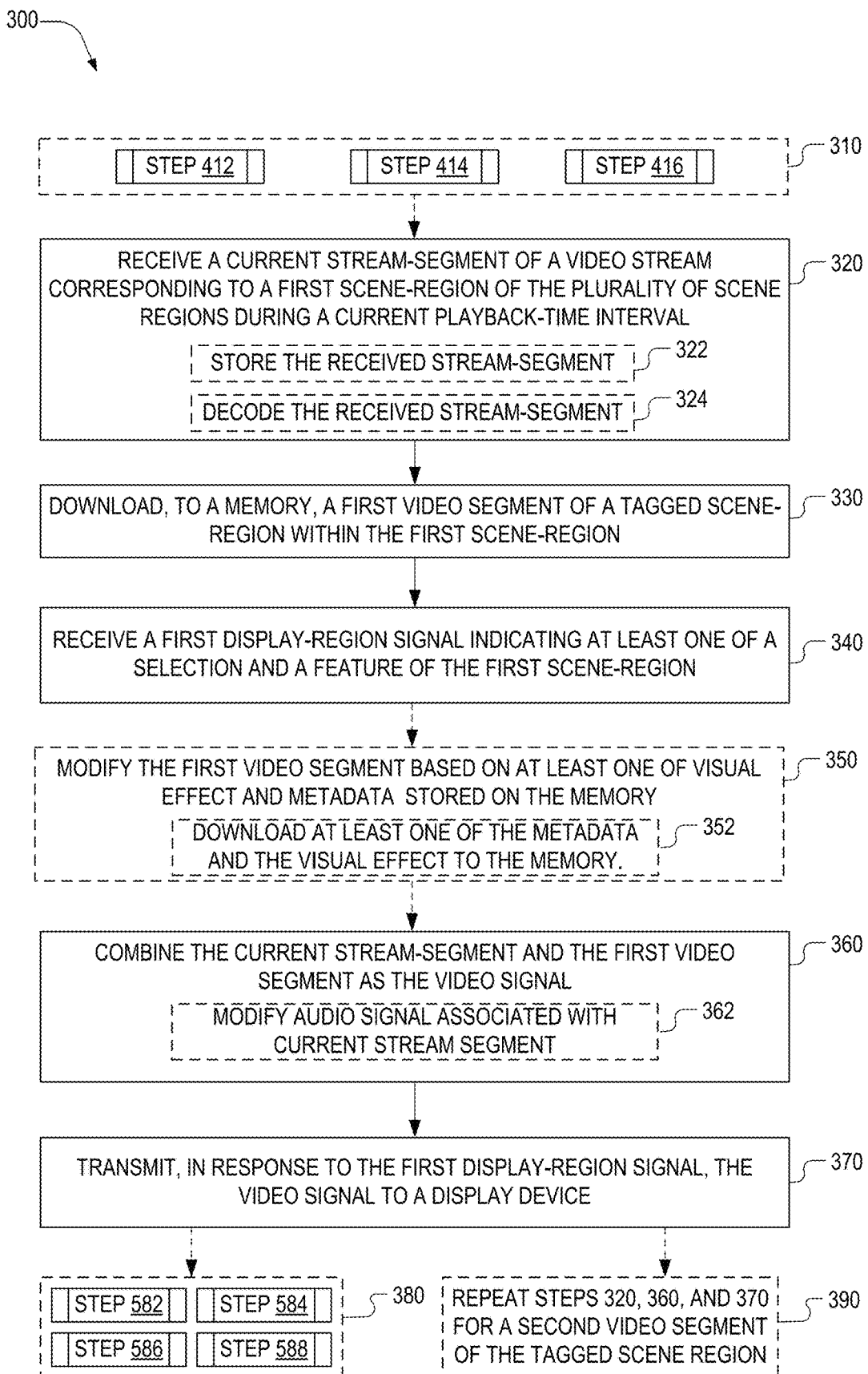
FIG. 3 is a flowchart illustrating a method for generating a video signal, in an embodiment.

FIG. 3 is a flowchart illustrating a method 300 for generating a video signal representing a temporally-varying scene having a plurality of scene-regions. Method 300 includes steps 320, 330, 340, 360, and 370, and may be implemented within one or more aspects of video content controller 200. For example, method 300 is implemented by microprocessor 224 executing computer-readable instructions of software 250. FIGS. 2 and 3 are best viewed together in the following description.

Step 320 is one of receiving a current stream-segment of a video stream corresponding to a first scene-region of the plurality of scene-regions during a current playback-time interval. In an example of step 310, video content controller 200 receives stream-segment 236(i), where time interval 278(i) is the current playback-time interval.

Step 320 may include steps 322 and 324. Step 322 is one of storing the received stream-segment in a memory. In an example of step 322, video content controller 200 stores stream-segment 236(i) in memory 232. Step 324 is one of decoding the received stream-segment. In an example of step 324, codec 251 of video content controller 200 decodes stream-segment 236(i).

Step 330 is one of downloading, to a memory, a first video segment of a tagged scene-region within the first scene-region. In an example of step 330, video content controller 200 downloads AV segment 260(j) to memory 234, where AV segment 260(j) corresponds to tagged scene-region 271T(j). Step 330 may include downloading a plurality of video segments each corresponding to the tagged scene-region at different play-back time intervals. For example, video content controller 200 downloads a plurality of AV segments 260, e.g., AV segments 260(j+1, . . . ) shown in FIG. 2, which correspond to tagged scene-regions 271T(j+1, . . . ).

Step 340 is one of receiving a first display-region signal indicating at least one of a selection and a feature of the first scene-region. In an example of step 340, video content controller 200 receives display-region signal 194S, which indicates at least one of a selection and a feature of first scene-region 271(i). The selection or feature of first scene-region 271(i) may correspond to tagged scene-region 271T(i) being within field of view 110X, entering field of view 110X, or being displayed on screen 192. The selection or feature of first scene-region 271(i) may also correspond to a scene region adjacent to tagged scene-region 271T(i) being displayed on screen 192. For example, display-region signal 194S is generated in response to viewer 110's panning scene 170 by moving head 112 or eyes 114 in a direction toward first scene-region 271(i).

When video display 190 is a head-mounted display, viewer 110 may generate display-region signal 194S by turning head 112 toward one of scene-region 172. When video display 190 includes an eye tracker, viewer 110 may generate display-region signal 194S by moving eyes 114 such that scene-region 172 is in the field of view of eyes 114. In an example use scenario, viewer 110 may be attending to the musical performance of second scene-region 172 and, at the end of a song, attend to first scene-region 171, and thereby generate display-region signal 194S.

Method 300 may include a step 350 of modifying the first video segment based on at least one of visual effect and metadata stored on the memory. In a first example of step 350, scene modifier 254 modifies AV segment 260(j) based on at least one of visual effects 268 and metadata 265(k). In step 350, the metadata may be associated with a play-back time interval corresponding to the current stream-segment. For example, metadata 265(k) is associated with time segment 266(k), which corresponds to time interval 278(i) of the current stream-segment 236(i).

Scene modifier 254 may modify AV segment 260(j) with a composite metadata associated with a plurality of time segments, e.g., an average (such as a weighted average), or an interpolation (or blend) of metadata 265(k) and metadata 265(k±1). Scene modifier 254 may form such composite or interpolated metadata when a difference between consecutive metadata, e.g., metadata 265(k) and metadata 265(k±1) exceed a predetermined threshold. The threshold is, for example, associated with a change in ambient lighting (luminance), such as caused by change in cloud cover.

Step 350 may also include a step 352 of downloading at least one of the metadata and the visual effect to the memory. In an example of step 350, video content controller 200 downloads at least one of visual effects 268 and metadata 265(k) to memory 234.

Step 360 is one of combining the current stream-segment and the first video segment as the video signal. In an example of step 360, combiner 252 combines stream-segment 236(i) and AV segment 260(j) to form a temporal segment 209(m) of video signal 209S. In step 360, the first video segment may have a higher resolution than the current stream segment. Combiner 252 may implement step 360 by one or more of pixel blending, morphing, keying, and digital compositing methods known in the art.

Step 370 is one of transmitting, in response to the first display-region signal, the video signal to a display device. In an example of step 370, video content controller 200 transmits, in response to display-region signal 194S, temporal segment 209(m) to video display 190. In an embodiment, N4=N1 such that each temporal segments 209 corresponds a respective stream-segment 279.

Figure 4:
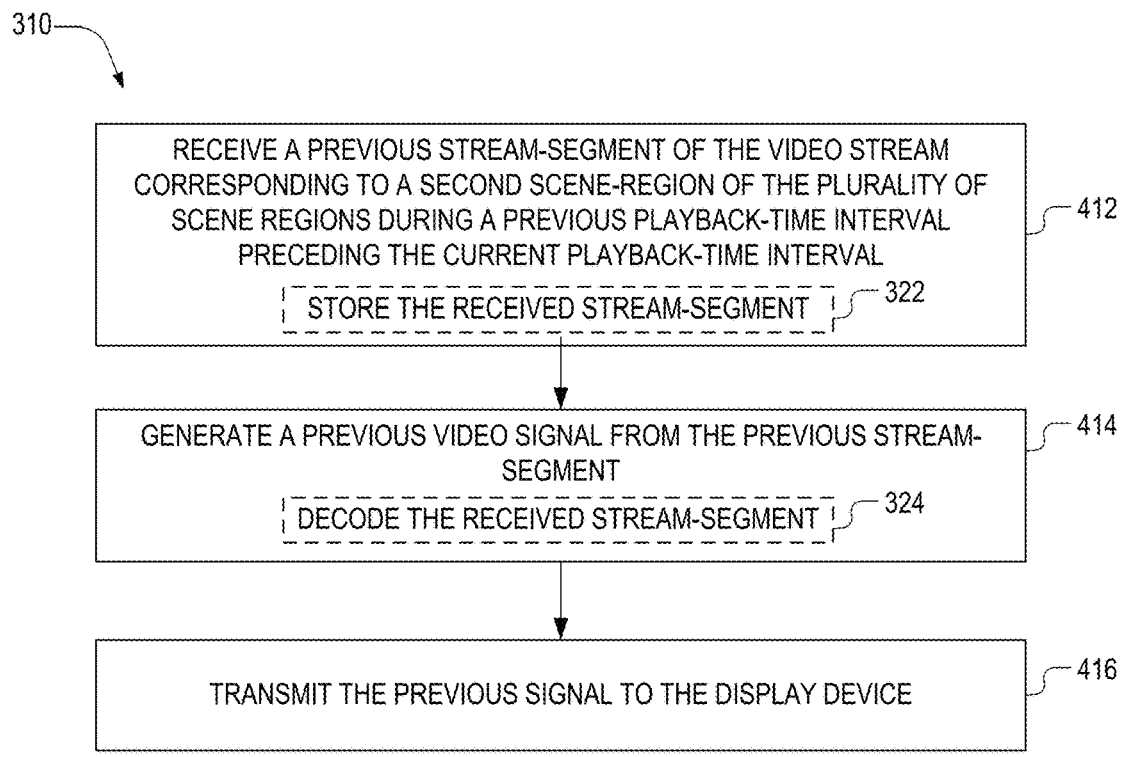
FIG. 4 is a flowchart illustrating details of step 310 of the method of FIG. 3, in an embodiment.

Method 300 may also include a step 310, illustrated as a flowchart in FIG. 4. Step 310 includes steps 412, 414, and 416. Step 412 is one of receiving a previous stream-segment of the video stream corresponding to a second scene-region of the plurality of scene-regions during a previous playback-time interval preceding the current playback-time interval. In an example of step 412, video content controller 200 receives stream-segment 236(i−1), where corresponding time interval 278(i−1) is the previous playback-time interval. Stream-segment 236(i−1) may include part or all of stream segment 279(i−1). For example, stream-segment 236(i−1) includes scene-region 272(i−1), of which second scene-region 172 (FIG. 1) is an example.

Step 412 may include step 322, previously introduced in the description of step 320. In an example of step 322, video content controller 200 stores stream-segment 236(i−1) in memory 232.

The previous stream-segment introduced in step 310 (in step 412, specifically) may include a previous audio signal associated with the second scene-region. The current stream-segment may include a current audio signal associated with the first scene-region. For example, the previous audio signal and current audio signal are associated with stream-segment 236(i−1) and stream-segment 236(i), respectively, which may respectively correspond to at least part of stream-segment 279(i−1) and stream-segment 279(i).

When method 300 includes step 310, step 360 may further include a step 362. Step 362 is one of modifying the current audio signal such that it differs from the previous audio signal in at least one of amplitude and spectral content. In an example of step 362, combiner 252 modifies the current audio signal associated with stream-segment 236(i) such that it differs, in at least one of amplitude and spectral content, from the previous audio signal associated with stream-segment 236(i−1). In the context of the music performance of second scene-region 172, stream-segment 236(i−1) may correspond to the musical performance at a time interval corresponding to index (i−1), and include associated audio.

In an example of step 362, combiner 252 partially mutes audio signal associated with stream-segment 236(i) because the viewer is attending to at least part of first scene-region 171, such as one of tagged regions 171A, 171B, or 171C, which may have their own associated audio that is included the video signal formed in step 360. In step 262, combiner 252 may also modify sound localization properties of the audio signal.

Step 414 is one of generating a previous video signal from the previous stream-segment. In an example of step 414, video content controller generates video signal 209S from stream-segment 236(i−1). Step 414 may include step 324, previously introduced in the description of step 320. In an example of step 324, codec 251 of video content controller 200 decodes stream-segment 236(i−1).

Step 416 is one of transmitting the video signal to the display device. In an example of step 416, video content controller 200 transmits temporal segment 209(m−1) to video display 190.

Figure 5:
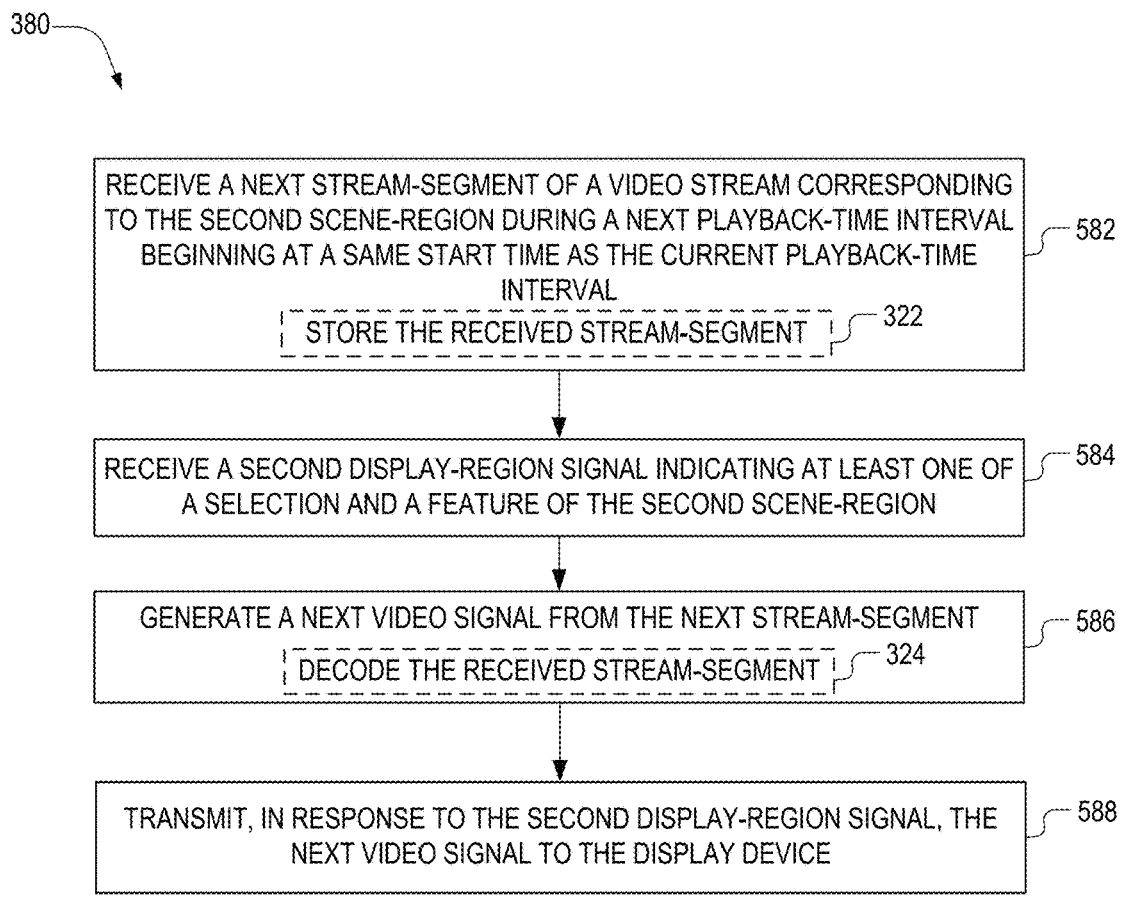
FIG. 5 is a flowchart illustrating details of step 380 of the method of FIG. 3, in an embodiment.

Method 300 may also include a step 380, illustrated as a flowchart in FIG. 5. When method 300 includes step 380, step 380 is executed at least after step 340, and may also be executed after steps 360 and 370. Step 380 includes steps 582, 584, and 586. Step 380 may be understood in the context of the example use scenario introduced in step 340, where viewer 110 attends to first scene-region 171 at the end of a song of the musical performance of second scene-region 172 (FIG. 1). In this scenario, step 380 corresponds to when viewer 110's attention returns to the musical performance of second scene-region 172.

Step 582 is one of receiving a next stream-segment of the video stream corresponding to the second scene-region during a next playback-time interval beginning at a same start time as the current playback-time interval. The next playback-time interval corresponds, for example, to the end of the song shown in second scene-region 172 such that viewer 110 does not miss any of the musical performance shown in second scene-region 172 when attending to first scene-region 171.

In a first example of step 582, video content controller 200 receives stream-segment 236(i), where corresponding time interval 278(i) is both the next playback-time interval and a repeated playback-time interval. In a second example of step 582, video content controller 200 receives stream-segment 236(i+1), where corresponding time interval 278(i+1) is the next playback-time interval. Step 582 may include step 322, previously introduced in the description of step 320. In an example of step 322, video content controller 200 stores stream-segment 236(i+1) in memory 232.

Step 584 is one of receiving a second display-region signal indicating at least one of a selection and a feature of the second scene-region. In an example of step 584, video content controller 200 receives display-region signal 194S, which indicates at least one of a selection and a feature of second scene-region 272(i).

Step 586 is one of generating a next video signal from the next stream-segment. In an example of step 586, video content controller generates video signal 209S from stream-segment 236(i+1). Step 586 may include step 324, previously introduced in the description of step 320. In an example of step 324, codec 251 of video content controller 200 decodes stream-segment 236(i+1).

Step 588 is one of transmitting the video signal to the display device. In an example of step 588, video content controller 200 transmits temporal segment 209(m+1) to video display 190.

Method 300 may include a step 390, which is one of repeating steps 320, 360, and 370 for a next stream-segment of the tagged scene region. Step 390 may occur after steps 360 and 370. That is, step 390 includes step 320 as applied to the next stream segment: receiving a next stream-segment of a video stream corresponding to the first scene-region during a next playback-time interval after the current playback-time interval. The next stream-segment is, for example, stream-segment 236(i+1), which may include first scene-region 271(i+1). Step 390 also includes steps 360 and 370 as applied to the next stream-segment: combining the next stream-segment and the first video segment as a next video signal, and transmitting the next video signal to the display device. The next video signal is temporal segment 209(m+1) of video signal 209S. Method 300 may repeat step 390 any number of times such that the first video segment is displayed repeatedly, e.g., as a loop, on video display 190.

Step 390 may also include implementing (and/or repeating) step 350. For example, method 300 may repeat step 390 such that first video segment is displayed repeatedly as a loop, wherein the first video segment includes visual effect 268 in selected iterations of the loop. Scene modifier 254 may determine which loop iterations include a visual effect 268 (and also, when applicable, which variant of a visual effect), for example, by implementing a random number generator.

Combinations of Features

Features described above as well as those claimed below may be combined in various ways without departing from the scope hereof. The following examples illustrate some possible, non-limiting combinations:

"(A1)" denotes a method for generating a video signal representing a temporally-varying scene having a plurality of scene-regions. Each of the plurality of scene-regions may be spatial regions of the scene. The method includes steps of: receiving a current stream-segment, downloading, receiving a display-region signal, combining, and transmitting. The step of receiving is one of receiving a current stream-segment of a video stream corresponding to a first scene-region of the plurality of scene-regions during a current playback-time interval. The step of downloading is one of downloading, to a memory, a first video segment of a tagged scene-region within the first scene-region. In the step of receiving the first display-region signal, the signal indicates at least one of a selection and a feature of the first scene-region. The step of combining is one of combining the current stream-segment and the first video segment as the video signal. The step of transmitting is one of transmitting, in response to the first display-region signal, the video signal to a display device.

(A2) The method denoted by (A1) may further include: (a) receiving a next stream-segment of the video stream corresponding to the first scene-region during a next playback-time interval after the current playback-time interval, (b) combining the next stream-segment and the first video segment as a next video signal, and (c) transmitting the next video signal to the display device.

(A3) The method denoted by (A2) may further include stochastically determining an integer and repeating the steps, in claim 2, of receiving, combining, and transmitting a number of times equal to the absolute value of the integer.

(A4) A method denoted by any of (A1)-(A2) may further include, before combining, modifying the first video segment based on at least one of a visual effect and metadata stored on the memory.

(A5) The method denoted by (A4) may further include downloading at least one of the metadata and the visual effect to the memory.

(A6) When the step of modifying is based on the stored metadata, any method denoted by one of (A4) and (A5) may further include modifying at least one of luminance, chrominance, color histogram, brightness, contrast, gamma correction, saturation, and local spatial pixel/area context of the first video segment.

(A7) Any method denoted by one of (A1)-(A6) may further include, after transmitting the video signal: (a) receiving a next stream-segment of the video stream corresponding to the first scene-region during a next playback-time interval after the current playback-time interval, (b) generating a next video signal from the next stream-segment, and (c) transmitting the next video signal to the display device.

(A8) Any method denoted by one of (A1)-(A7) may further include, before transmitting the video signal, (a) receiving a previous stream-segment of the video stream corresponding to a second scene-region of the plurality of scene-regions during a previous playback-time interval preceding the current playback-time interval, (b) generating a previous video signal from the previous stream-segment, and (c) transmitting the previous video signal to the display device.

(A9) Any method denoted by (A8) may further include, after receiving the first display-region signal, steps of (a) receiving a next stream-segment of the video stream corresponding to the second scene-region during a next playback-time interval beginning at a same start time as the current playback-time interval, (b) receiving a second display-region signal indicating at least one of a selection and a feature of the second scene-region, (c) generating a next video signal from the next stream-segment; and, (d) transmitting, in response to the second display-region signal, the next video signal to the display device.

(A10) In any method denoted by one of (A8) and (A9), in which the previous video signal includes previous audio signal associated with the second scene-region, and the current stream-segment includes current audio signal associated with the first scene-region, the step of combining may further include modifying the current audio signal such that differs from the previous audio signal in at least one of amplitude and spectral content.

(A11) In any method denoted by one of (A1) through (A10), the first video segment may be a static image corresponding to the tagged scene-region.

(A12) In any method denoted by one of (A1) through (A10), in the step of receiving the first display-region signal, the first display-region signal may be at least in part determined by an eye tracker communicatively coupled with the display device.

(B1) A video content controller includes a memory and a microprocessor. The memory is configured to store non-transitory computer-readable instructions and video data representing a temporally-varying scene having a plurality of scene-regions. The microprocessor adapted to execute the instructions to execute any of the methods denoted by (A1)-(A10).

(B2) In any video content controller denoted by (B1), the first video segment may be a static image corresponding to the tagged scene-region.

(B3) In any video content controller denoted by one of (B1) and (B2), the first display-region signal may be at least in part determined by an eye tracker communicatively coupled with the display device.

Changes may be made in the above video-signal-generating methods and video content controller without departing from the scope hereof. It should thus be noted that the matter contained in the above description or shown in the accompanying drawings should be interpreted as illustrative and not in a limiting sense. Herein, and unless otherwise indicated, the adjective "exemplary" means serving as an example, instance, or illustration. The following claims are intended to cover all generic and specific features described herein, as well as all statements of the scope of the present video-signal-generating method and video content controller, which, as a matter of language, might be said to fall therebetween.

What is claimed is:

1. A method for generating a video signal representing a temporally-varying scene having a plurality of scene-regions, comprising:
    receiving, with a controller, a first segment of a video stream corresponding to a first scene-region of the plurality of scene-regions during a current playback-time interval;
    receiving, with the controller, a second segment corresponding to a second scene-region within the first scene-region;
    selecting, with the controller, one of either a composite metadata or an interpolated metadata based on a difference between consecutive metadata exceeding a threshold;
    modifying, with the controller, the first video segment with the selected one of the composite metadata or the interpolated metadata;
    generating, with the controller, a combined signal by combining the first segment and the second segment, the combined signal including data corresponding to the first scene-region at a first image resolution and data corresponding to the second scene-region at a second image resolution different from the first image resolution; and
    transmitting, with the controller and after combining the first segment and the second segment, the combined signal to a display device that displays the temporally-varying scene represented by the combined signal.

2. The method of claim 1, wherein the first image resolution is lower than the second image resolution.

3. The method of claim 1, further comprising:
    stochastically determining, with the controller, an integer; and
    repeating the operations, in claim 1, of receiving, generating, and transmitting a number of times equal to the absolute value of the integer.

4. The method of claim 1, further comprising, before generating:
    modifying, with the controller, the second segment based on at least one of a visual effect or a metadata stored in a memory.

5. The method of claim 4, further comprising downloading, with the controller, at least one of the metadata or the visual effect to the memory.

6. The method of claim 4, the modifying being based on the stored metadata, and further comprising modifying, with the controller, at least one of luminance, chrominance, color histogram, brightness, contrast, gamma correction, saturation, or local spatial pixel or area context of the first segment.

7. The method of claim 1, further comprising:
receiving, with the controller, a region signal from a user, and
determining, with the controller, an area of the second scene-region within the first scene-region based on the region signal.

8. The method of claim 7, wherein the region signal indicates a field-of-view of the user or a change in the field-of-view of the user.

9. The method of claim 7, wherein receiving the second segment includes retrieving, with the controller, video data corresponding to the second scene-region from a memory.

10. A non-transitory computer-readable-medium storing instructions that, when executed by a processor of a computer, cause the computer to perform operations comprising the method of claim 1.

11. A video content controller comprising:
a memory; and
a microprocessor configured to:
receive a first segment of a video stream corresponding to a first scene-region of the plurality of scene-regions during a current playback-time interval,
receive a second segment corresponding to a second scene-region within the first scene-region,
select one of either a composite metadata or an interpolated metadata based on a difference between consecutive metadata exceeding a threshold,
modify the first video segment with the selected one of the composite metadata or the interpolated metadata,
generate a combined signal by combining the first segment and the second segment, the combined signal including data corresponding to the first scene-region at a first image resolution and data corresponding to the second scene-region at a second image resolution different from the first image resolution, and
transmit, after combining the first segment and the second segment, the combined signal to a display device that displays the temporally-varying scene represented by the combined signal.

12. The video content controller of claim 11, wherein the first image resolution is lower than the second image resolution.

13. The video content controller of claim 11, wherein the microprocessor is further configured to:
stochastically determine an integer; and
repeating the operations of receiving, generating, and transmitting a number of times equal to the absolute value of the integer.

14. The video content controller of claim 11, wherein the microprocessor is further configured to, before generating:
modify the second segment based on at least one of a visual effect or a metadata stored in the memory.

15. The video content controller of claim 14, wherein the microprocessor is further configured to download at least one of the metadata or the visual effect to the memory.

16. The video content controller of claim 14, wherein the microprocessor is configured to modify the second segment based on the stored metadata, and wherein the microprocessor is further configured to modify at least one of luminance, chrominance, color histogram, brightness, contrast, gamma correction, saturation, or local spatial pixel or area context of the first segment.

17. The video content controller of claim 11, wherein the microprocessor is further configured to:
receive a region signal from a user, and
determine an area of the second scene-region within the first scene-region based on the region signal.

18. The video content controller of claim 17, wherein the region signal indicates a field-of-view of the user or a change in the field-of-view of the user.

19. The video content controller of claim 17, wherein the microprocessor is configured to receive the second segment by retrieving video data corresponding to the second scene-region from the memory.

20. The video content controller of claim 11, wherein the display device is separate from the video content controller.

* * * * *